Sept. 1, 1925.

H. C. PRIEBE

CAR TRUCK

Filed April 7, 1924

1,551,904

2 Sheets-Sheet 1

Inventor:
Hermon C. Priebe

Sept. 1, 1925.    1,551,904
H. C. PRIEBE
CAR TRUCK
Filed April 7, 1924    2 Sheets-Sheet 2

Inventor:
Herman C. Priebe

Patented Sept. 1, 1925.

1,551,904

UNITED STATES PATENT OFFICE.

HERMAN C. PRIEBE, OF CHICAGO, ILLINOIS.

CAR TRUCK.

Application filed April 7, 1924. Serial No. 704,799.

*To all whom it may concern:*

Be it known that I, HERMAN C. PRIEBE, a citizen of the United States, residing at Chicago, in the county of Cook and the State of Illinois, have invented a certain new and useful Improvement in Car Trucks, of which the following is a full, clear, concise, and exact description.

My invention relates to trucks for railway cars and resides in an improved assembly of the brake beams thereof.

In carrying out my invention, each brake beam assembled in accordance with my invention is carried at its mid portion by the adjacent truck bolster. In the preferred embodiment of the invention a bracket is provided upon the bolster and a carrier for the mid portion of the beam, overhung by the carrier, is provided upon this bracket.

Figure 1:
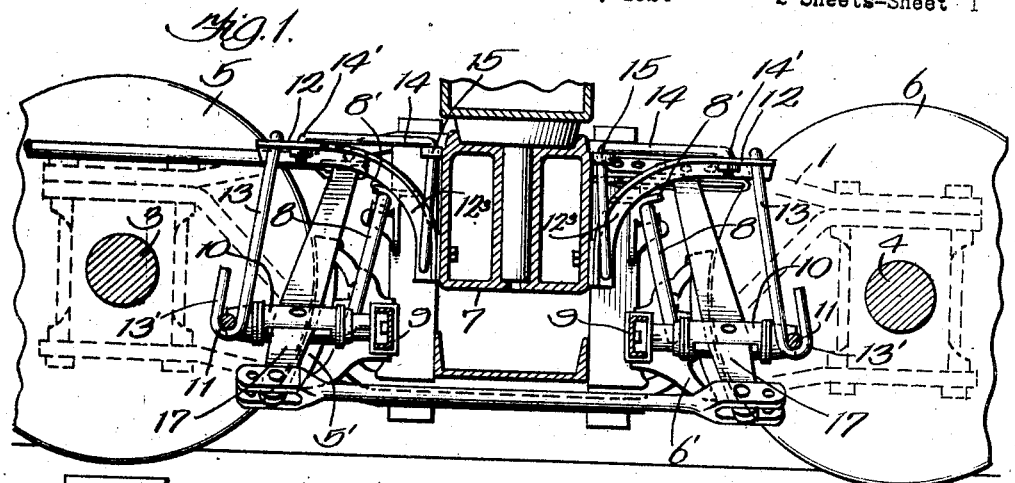
Figure 2:
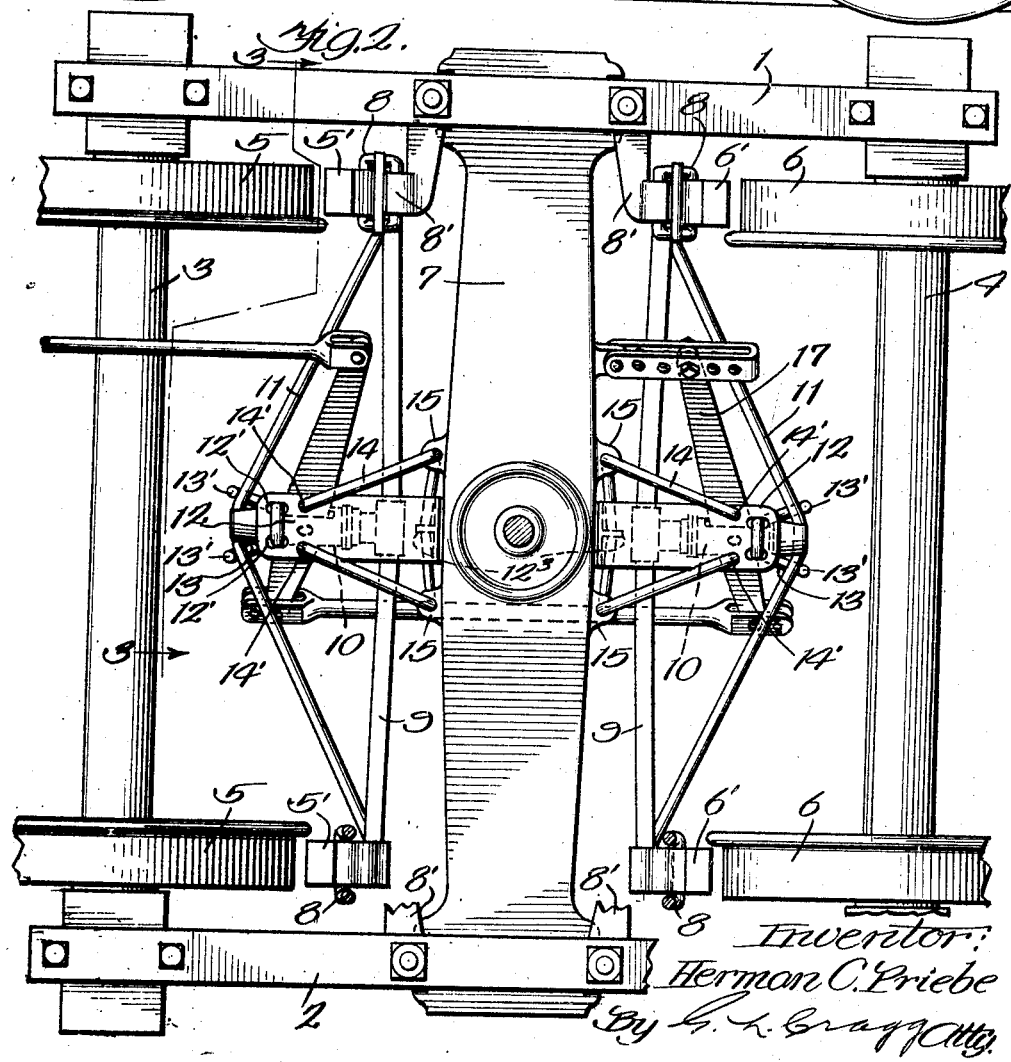
Figure 3:
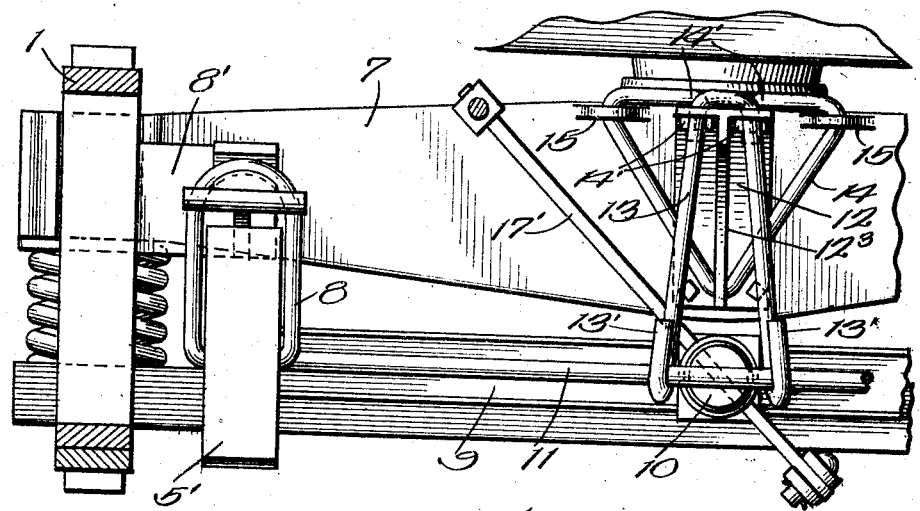
Figure 4:
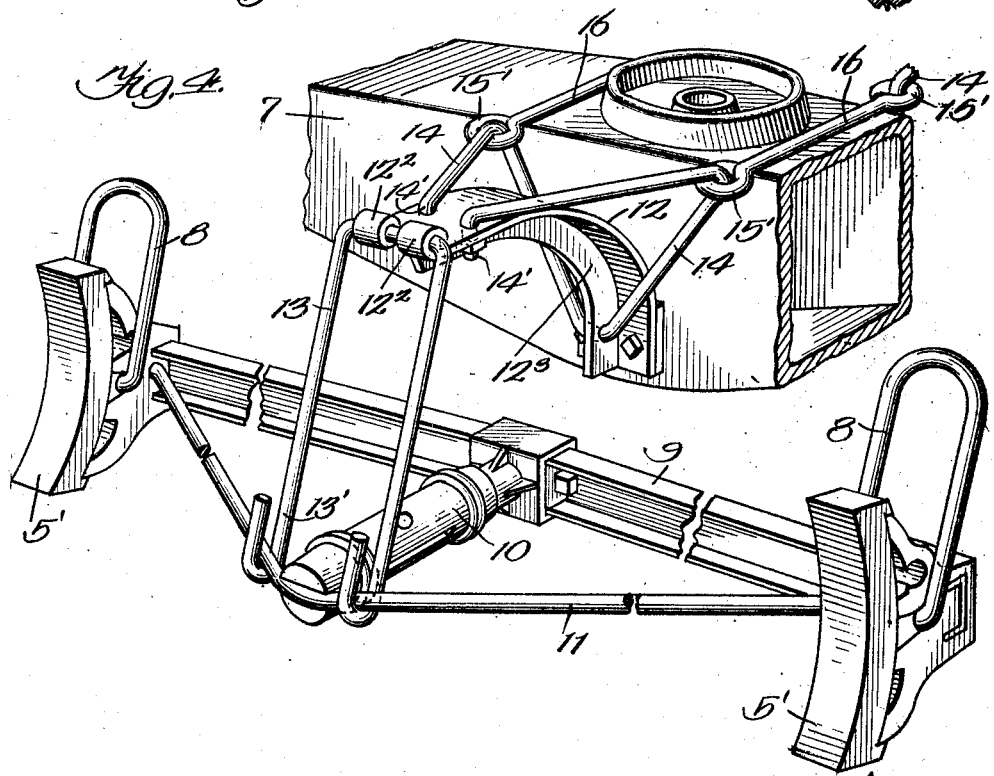

The invention will be fully explained in connection with the accompanying drawings in which Fig. 1 is a longitudinal sectional elevation of a car truck constructed in accordance with one embodiment of the invention; Fig. 2 is a plan view; Fig. 3 is a sectional view on line 3—3 of Fig. 2; and Fig. 4 is a perspective view illustrating another embodiment of the invention.

Like parts are indicated by similar characters of reference throughout the different figures.

The side frames 1, 2 of the truck are journaled upon the axles 3, 4 of the car wheels 5, 6, in a manner well known. The truck bolster 7 extends across the space between the side frames and extends, at its ends, through the side frames.

Brakes 5′ 6′ are presented to the car wheels 5, 6. These brakes are carried by the hangers 8 that are preferably in the form of links depending from the brackets 8′ that are provided upon the side frames. The brakes on each side of the truck bolster are assembled with the ends of the brake beam 9 upon the same truck bolster side therewith. Each brake beam has one end of a fulcrum post 10 assembled with its mid portion, a slot in the other end of this post receiving the bight portion of a truss rod 11 whose ends are secured to the brakes upon the ends of the corresponding beam. A bracket 12 is provided upon each upright side of the bolster and overhangs the adjacent beam and fulcrum post. A carrier 13 depends from the outer end of each bracket, and is preferably in the form of a U shaped loop whose bight portion may turn upon the bracket supporting it, and whose ends are shaped into hooks 13′ receiving and in supporting engagement with the adjacent rod 11. In the form of the invention illustrated in Figs. 1, 2, and 3, the sides of each loop 13 pass through openings 12′ in the top of the corresponding bracket, while in the form shown in Fig. 4, the bight portion of each loop is journaled, like the pintle of a hinge within the sleeves $12^2$ upon the top of the bracket. In both forms of the invention each bracket is braced by a rod 14 whose mid portion passes through and is held by the web $12^3$ of the corresponding bracket, whose side portions pass through eyes 15 upon the bolster and whose ends 14′ are bent to pass through holes formed in the outer end of the corresponding bracket.

In the form of the invention illustrated in Figs. 1, 2 and 3, said eyes 15 are integral parts of the bolster. In the form of the invention illustrated in Fig. 4, the eyes upon opposite sides of the bolster are formed in links 16 extending across the top of the bolster, this arrangement being desirable where my invention is to be supplied to existing equipment in which the truck bolsters are not formed with such eyes.

The levers 17 of usual brake operating mechanism are fulcrumed in the posts 10.

It is obvious that changes may be made without departing from the spirit of my invention.

Having thus described my invention I claim as new and desire to secure by Letters Patent the following:—

In a car truck, the combination with the side frames thereof; of wheels carrying said side frames; brakes for said wheels; a brake beam having a brake upon each end; brake hangers upon the side frames and carrying the ends of said brake beam and the brakes thereon; a fulcrum post having one end assembled with a mid portion of said brake beam; a rod assembled at its ends with end portions of the brake beam and engaged at its mid portion by the other end of said fulcrum post; an operating lever upon said fulcrum post; a truck bolster; a bracket upon the truck bolster and overhanging the beam; and a carrier upon the bracket in the form of a U shaped loop whose bight is mounted to turn upon the bracket and whose ends are shaped into hooks receiving and supporting said rod.

In witness whereof, I hereunto subscribe my name.

HERMAN C. PRIEBE.